United States Patent Office 3,281,469
Patented Oct. 25, 1966

3,281,469
PROCESS FOR PREPARING 5 - HYDROXY - 5 - (3-AMINOALKYNYL)DIBENZO[a,d]CYCLOHEPTA[1,4]DIENES
Lynn R. Peters, Indianapolis, and George F. Hennion, South Bend, Ind., assignors to Eli Lilly and Company, Indianapolis, Ind., a corporation of Indiana
No Drawing. Filed Aug. 10, 1962, Ser. No. 216,029
3 Claims. (Cl. 260—570.8)

The present application is a continuation-in-part of our application Serial No. 175,796, filed February 26, 1962 and now abandoned.

This invention relates to certain novel derivatives of dibenzo[a,d]cyclohepta[1.4]diene and to methods for preparing such derivatives.

Certain 5 - (3 - aminopropylidene)dibenzo[a.d]cyclohepta[1.4]dienes are valuable therapeutic agents useful in the treatment of depressive states. Currently available methods for the preparation of such compounds involve the use of a Grignard reagent in the preparation of intermediates necessary for the synthesis of such compounds. The relatively high cost of preparation of Grignard reagents and the hazards attendant upon their use, particularly in large quantities, have always been considered serious drawbacks to the employment of such reagents on a commercial scale. It is an object of this invention to provide intermediates for the synthesis of the above-mentioned antidepressive compounds, the preparation of which is not dependent upon the employment of Grignard reagents. It is a further object to provide such intermediates from relatively inexpensive starting materials. These and other objects of the invention will become more easily understood from the description of the invention provided herein.

In accordance with the invention, intermediates useful for the preparation of 5-(3-aminoalkylidene)dibenzo[a.d]cyclohepta[1.4]dienes are provided by a process, the distinguishing features of which are illustrated in the following reaction sequence:

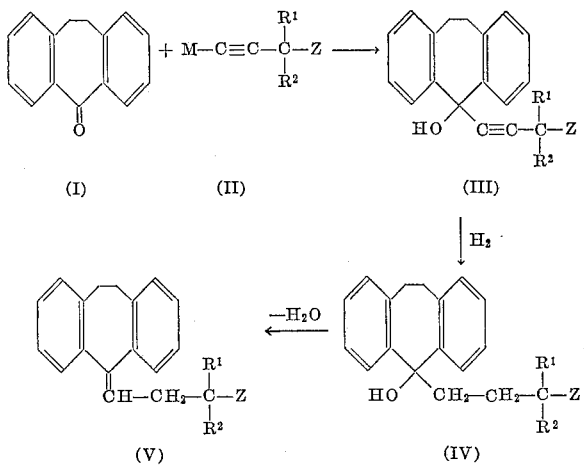

In the above scheme, M represents an alkali metal such as sodium, potassium, lithium, and the like; $R^1$ and $R^2$ when taken separately can be hydrogen or lower alkyl, and $R^1$ and $R^2$ when taken together with the carbon atom to which they are attached form a cycloaliphatic ring such as cyclobutyl, cyclopentyl, cyclohexyl, cycloheptyl, and the like; and Z can be

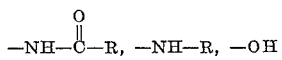

or a group readily convertible to —OH, wherein R can be hydrogen, lower alkyl, or aryl. By lower alkyl is meant a straight or branched chain containing from one to four carbon atoms, such as methyl, ethyl, isopropyl, tertiary butyl, and the like.

In one preferred embodiment of the invention, a toluene solution containing both 5-ketodibenzo[a,d]cycloheptal[1.4]diene (I), and the acetylenic compound is added to a suspension of sodium amide in liquid ammonia to produce first the sodium acetylide derivative (II, M=sodium), which subsequently reacts with the keto compound to form the sodium salt of a 5-hydroxy-5-(3-substituted - 1 - alkynyl)dibenzo[a,d]cyclohepta[1.4]diene (III). Alkali metals other than sodium, as for example potassium or lithium, can be used with equally good results. The metal salt is then hydrolyzed by treatment with water and the 5-hydroxy-5-substituted-alkynyl derivative is then hydrogenated in the presence of a suitable catalyst, such as Raney nickel, palladium, or the like, to produce a 5-hydroxy-5-(3-substituted-alkyl)dibenzo[a,d]cyclohepta[1.4]diene (IV). This compound is a tertiary alcohol having a substituted alkyl group attached to the carbon atom carrying the tertiary alcohol group, and will, upon treatment with acid, lose a molecule of water to yield a 5-(3-substituted-alkylidene)dibenzo[a,d]cyclohepta[1.4]diene (V).

In the case where Z is —NH—R, compound V is the desired final product. When Z represents any other group, additional steps are required to complete the synthesis. Thus, for example, when Z is

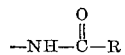

reduction of the acyl group with lithium aluminum hydride to give an alkyl group is required as a final step in the preparation of the desired 5-(3-substituted-aminopropylidene)dibenzo[a,d]cyclohepta[1.4]diene. In this instance the sequence in which the last two steps in the synthesis are carried out is immaterial. The reduction of the amide to the amine with lithium aluminum hydride can precede the dehydration of the tertiary alcohol with equally good results. In the event that the desired compound is the primary amine derivative, hydrolysis of the amide can be carried out under either acidic or basic conditions to afford the desired product. When the hydrolysis is carried out under acidic conditions, it is again possible to avoid a separate dehydration step, since by heating the 5-hydroxy - 5-(3-acylamidoalkyl)dibenzo[a,d]cyclohepta[1.4]diene with aqueous acid under reflux, there is effected a simultaneous hydrolysis of the amide to the amine and a dehydration of the tertiary alcohol to form an ethylenic bond.

When Z is —OH, additional steps are also required to complete the synthesis. The reaction sequence can be followed as described through compound V. The 5-(3 - hydroxyalkylidene)dibenzo[a,d]cyclohepta[1.4]diene so obtained is then treated with thionyl chloride, phosphorus, pentachloride, phosphorus tribromide, hydrogen bromide, or the like, in order to effect replacement of the —OH by halogen. If desired, a separate dehydration step can be avoided by treating the 5-hydroxy - 5 - (3 - hydroxyalkyl)dibenzo[a,d]cyclohepta[1.4]diene (IV) with one of the above halogenating agents. This treatment serves not only to substitute a halogen atom for the —OH group attached to the side chain, but also to dehydrate the tertiary alcohol to give the corresponding haloalkylidene compound. The resulting 5 - (3 - haloalkylidene)dibenzo[a,d]cyclohepta[1.4]diene, by whichever method obtained, can then be treated with an amine in the usual manner to produce the desired compound.

When Z is a group convertible to —OH, such as benzyloxy, it can, if desired, be so converted at any suitable point in the reaction scheme, and the remaining steps can then be carried out to complete the reaction sequence. Thus, for example, the benzyl group can be removed by hydrogenolysis of 5-hydroxy-5-(3-benzyloxyalkyl)dibenzo [a,d]cyclohepta[1.4]diene to yield 5-hydroxy-5-(3-hydroxyalkyl)dibenzo[a,d]cyclohepta[1.4]diene. Such treatment, of course, must be carried out prior to the dehydration to the alkylidene compound. Otherwise, the hydrogenolysis of the benzyl group would be accompanied by a saturation of the alkylidene linkage, leaving no convenient means of reintroducing the double bond. Alternatively, replacement of this group can be effected directly, as for example by treatment of the benzyloxy derivative with 48 percent hydrobromic acid to give the corresponding bromo derivative without prior isolation of the corresponding hydroxy compound.

The acetylenic derivative employed in the first step of the synthesis can be added as such, or if desired, it can be generated in situ from a suitable intermediate. Thus, for example, 2-chloro-3-methylamino-1-propene can be added to a suspension of sodium amide in liquid ammonia to provide the sodio derivative of 3-methylamino-1-propyne. This technique has the advantage of obviating the necessity of isolating the acetylenic derivative, which may in some cases be relatively unstable or inconvenient to handle.

Although sodium is the preferred alkali metal and the use of sodium amide in liquid ammonia is the preferred method for forming the metallo derivative of the alkyne (II), other alkali metals and other methods for forming the metallo derivatives can be employed. Thus, for example, the lithium or potassium derivatives of the acetylenic compound can be employed in the synthesis with similar results. For the formation of the metallo acetylides, metal hydrides such as sodium hydride, potassium hydride, and the like, and metal alkyls or aryls, such as amylsodium, phenylsodium, butyllithium, and the like, in inert solvents such as benzene, toluene, diethyl ether, and the like, can be employed in place of the preferred sodium amide in liquid ammonia.

The acid addition salts of the amino compounds of this invention can be prepared according to methods known in the art, as for example, by treating a solution of the amino compound in an inert solvent with an acid to precipitate the salt. When the amino compound still possesses a tertiary alcohol group in the 5-position of the dibenzocycloheptadiene, care must be taken during the preparation and isolation of the salt to avoid conditions which will promote dehydration of the alcohol. Typical of the salts which can be prepared are the hydrochlorides, hydrobromides, sulfates, phosphates, maleates, tartrates, p-toluenesulfonates, benzoates, salicylates, and the like.

Representative of the compounds which come within the scope of this invention are the following:

5-hydroxy-5-(3-hydroxy-1-propynyl)dibenzo[a,d] cyclohepta[1.4]diene,
5-hydroxy-5-(3-benzyloxy-1-propynyl)dibenzo[a,d] cyclohepta[1.4]diene,
5-hydroxy-5-(3-amino-1-propynyl)dibenzo[a,d] cyclohepta[1.4]diene,
5-hydroxy-5-(3-methylamino-1-propynyl)dibenzo[a,d] cyclohepta[1.4]diene,
5-hydroxy-5-(3-methylamino-1-propynyl)dibenzo [a,d]cyclohepta[1.4]diene hydrochloride,
5-hydroxy-5-(3-methylamino-1-propynyl)dibenzo [a,d]cyclohepta[1.4]diene sulfate,
5-hydroxy-5-(3-formamido-1-propynyl)dibenzo [a,d]cyclohepta[1.4]diene,
5-hydroxy-5-(3-hydroxypropyl)dibenzo [a,d]cyclohepta[1.4]diene,
5-hydroxy-5-(3-hydroxy-2, 2-dimethylpropyl)dibenzo [a,d]cyclohepta[1.4]diene,
5-hydroxy-5-(3-hydroxy-2-methylpropyl)dibenzo [a,d]cyclohepta[1.4]diene,
5-hydroxy-5-(3-aminopropyl)dibenzo[a,d]cyclohepta [1.4]diene,
5-hydroxy-5-(3-aminopropyl)dizenzo[a,d]cyclohepta [1.4]diene hydrobromide,
5-hydroxy-5-(3-aminopropyl)dibenzo[a,d]cyclohepta [1.4]diene hydrochloride,
5-hydroxy-5-(3-aminopropyl)dibenzo [a,d]cyclohepta [1.4]diene sulfate,
5-hydroxy-5-(3-benzylaminopropyl)dibenzo[a,d]cyclohepta [1.4]diene,
5-hydroxy-5-(3-benzylaminopropyl)dibenzo [a,d]cyclohepta[1.4]diene hydrochloride,
5-hydroxy-5-(3-acetamidopropyl)dibenzo[a,d]cyclohepta[1.4]diene,
5-hydroxy-5-(3-chloropropylidene)dibenzo[a,d]cyclohepta[1.4]diene,
5-hydroxy-5-(3-formamidopropylidene)dibenzo[a,d] cyclohepta[1.4]diene, and
5-hydroxy-5-(3-benzamidopropylidene)dibenzo[a,d] cyclohepta [1.4]diene.

In order to illustrate more clearly the operation of the invention, the preparative procedures which follow are provided by way of example. Numerous modifications and variations will be apparent to those skilled in the art and are within the scope of the invention.

EXAMPLE 1

*5-hydroxy-5-(3-hydroxypropynyl)dibenzo[a,d]cyclohepta [1.4]diene*

A suspension of sodium amide in liquid ammonia is prepared from 9.2 g. of sodium in 250 ml. of liquid ammonia in a flask equipped with a Dry Ice condenser. The addition of about 0.1 g. of hydrated ferric nitrate is beneficial in promoting the formation of sodium amide. To the stirred suspension there is added during the course of an hour a solution containing 11.2 g. of propargyl alcohol and 16.6 g. of 5-ketodibenzo[a,d]cyclohepta[1.4]diene in 80 ml. of toluene. After the addition has been completed, the reaction mixture is stirred vigorously for an additional half-hour. The Dry Ice condenser is then removed and stirring is continued for about eighteen hours longer while the reaction mixture is allowed to warm to room temperature and the ammonia evaporates. To the resulting mixture are added about 100 g. of ice and 100 ml. of toluene, stirring being maintained during the addition. The mixture is filtered and the solid product is washed with water. There are obtained 18.8 g. of 5 - hydroxy-5-(3-hydroxypropynyl)dibenzo[a,d]cyclohepta [1.4]diene melting at 180–186° C. Evaporation of the filtrate allows the recovery of an additional gram of product as well as some unreacted starting ketone. Purification of the product is accomplished by recrystallization from alcohol. The purified material melts at about 192–195° C.

*Analysis.*—Calc.: C, 81.79; H, 6.10. Found: C, 81.45; H, 6.14.

EXAMPLE 2

*5-hydroxy-5-(3-hydroxypropyl)dibenzo[a,d] cyclohepta[1.4]diene*

Hydrogenation of the 5-hydroxy-5-(3-hydroxypropynyl)dibenzo[a,b]cyclohepta[1.4]diene is accomplished as follows. One part by weight of the purified compound is suspended in about ten parts by volume of absolute alcohol and is subjected to a hydrogen pressure of 50 p.s.i. in the presence of about 3 percent by weight, based upon the propynyl compound, of a catalyst comprising 5 percent palladium on alumina. The temperature is maintained below 45° C. After the theoretical quantity of hydrogen has been absorbed, the catalyst is separated by filtration and the filtrate is evaporated to a syrup under vacuum. Addition of two parts by volume of toluene causes the crystallization of about one part by weight of 5 - hydroxy - 5 - (3-hydroxypropyl)dibenzo[a,d]cyclohepta[1.4]diene melting at about 82–86° C. This material contains toluene of solvation. Material recrystallized further from toluene and dried to constant weight in vacuo at 60° C. provides a sample suitable for analysis.

*Analysis.*—Calc.: C, 80.5; H, 7.5. Found: C, 79.92; H, 7.72.

EXAMPLE 3

*5-(3-hydroxypropylidene)dibenzo[a,b]cyclohepta[1.4]diene*

A solution containing 6.9 g. of the toluene-solvated 5-hydroxy-5-(3-hydroxypropyl)dibenzo[a.d]cyclohepta[1.4]diene in 60 ml. of xylene is boiled to remove the toluene. The solution is then cooled to 95° C., 0.1 g. of p-toluenesulfonic acid is added, and the mixture is heated under reflux for two hours in a flask equipped with a Dean-Stark water separator. The reaction mixture is cooled and washed successively with 6 ml. portions of water, 1 N sodium hydroxide solution, and water. The xylene solution is dried over anhydrous magnesium sulfate and, after the drying agent has been removed by filtration, the xylene is removed under vacuum. The residue is crystallized from isopropyl ether to give 5-(3-hydroxypropylidene)dibenzo[a,d]cyclohepta[1.4]diene melting at 80–86.5° C. A sample recrystallized from a mixture of hexane and isopropyl ether to a constant melting point melts at 88–91° C.

*Analysis.*—Calc.: C, 86.36; H, 7.25. Found: C, 86.10; H, 7.71.

EXAMPLE 4

*5-(3-chloropropylidene)dibenzo[a,d]cyclohepta[1.4]diene*

A solution comprising 16.7 g. of 5-(3-hydroxypropylidene)dibenzo[a,d]cyclohepta[1.4]diene, 5.4 g. of pyridine, and 34 ml. of chloroform is cooled to 2° C. and is maintained at that temperature with the aid of an ice bath while 8.8 g. of thionyl chloride are added dropwise. The reaction mixture is gradually heated to reflux during one hour and is maintained at reflux temperature for one and one-half hours. The reaction mixture is cooled to room temperature and is washed with 80 ml. of an aqueous solution containing 16 ml. of concentrated hydrochloric acid and then with 30 ml. of water. The chloroform layer is dried over anhydrous magnesium sulfate and, after being filtered from the drying agent, is evaporated to dryness. The crystalline residue is recrystallized from absolute ethanol to give 17 g. of 5-(3-chloropropylidene)dibenzo[a,d]cyclohepta[1.4]diene melting at 80–83° C. Repeated recrystallization of a sample from ethanol gives material melting at 80–84° C.

*Analysis.*—Calc.: C, 80.5; H, 6.38; Cl, 13.2. Found: C, 80.25; H, 6.43; Cl, 12.87.

If desired, a separate dehydration step can be eliminated by treating the 5-hydroxy-5-(3-hydroxypropyl)dibenzo[a,d]cyclohepta[1.4]diene directly with thionyl chloride. Replacement of the primary alcohol group and dehydration occur simultaneously. In a typical preparation, a solution of 25.2 g. of the dihydroxy compound and 15.6 g. of pyridine in 100 ml. of chloroform is cooled to 2° C. and the temperature is maintained below 3° C. while 25.5 g. of thionyl chloride are added. The solution is heated to reflux temperature during one hour and is maintained at reflux for four additional hours. The reaction mixture is cooled, washed twice with water, and dried over anhydrous magnesium sulfate. After being filtered from the drying agent, the solution is evaporated to a thick syrup, which is crystallized from absolute ethanol to give 22.5 g. of 5-(3-chloropropylidene)dibenzo[a,d]cyclohepta[1.4]diene, which is identical to the material obtained by the two-step process.

EXAMPLE 5

*5-hydroxy-5-(3-formamidopropynyl)dibenzo[a,d]cyclohepta[1.4]diene*

By substituting 16.6 g. of N-formylpropargylamine for the propargyl alcohol in the procedure of Example 1, there is obtained 5-hydroxy-5-(3-formamidopropynyl) dibenzo[a,d]cyclohepta[1.4]diene. The N-formylpropargylamine is prepared by adding slowly 16.8 g. of propargylamine to a stirred mixture of 27.6 g. of formic acid and 51 g. of acetic anhydride while maintaining the temperature below about 65° C., pouring the reaction mixture on ice, making the resulting mixture basic with sodium hydroxide, and isolating the product in the usual manner.

EXAMPLE 6

*5-hydroxy-5-(3-formamidopropyl)dibenzo[a,d]cyclohepta[1.4]diene*

This compound is obtained by hydrogenating 5-hydroxy-5-(3-formamidopropynyl)dibenzo[a,d]cyclohepta[1.4]diene according to the procedure described in Example 2.

EXAMPLE 7

*5-hydroxy-5-(3-methylaminopropynyl)dibenzo[a,d]cyclohepta[1.4]diene*

*Method A.*—The sodio derivative of 3-methylamino-1-propyne is prepared in situ by the dropwise addition of 11.6 g. of 2-chloro-3-methylamino-1-propene to a suspension of 0.2 mole of sodium amide in 150 ml. of anhydrous liquid ammonia in a flask equipped with a stirrer and Dry Ice condenser. The addition is carried out at the reflux temperature of the liquid ammonia and requires about 30 minutes. The resulting mixture is stirred for four and one-half additional hours and then a solution of 7.0 g. of 5-ketodibenzo[a,d]cyclohepta[1.4]diene in 25 ml. of xylene is added during about 10 minutes. Stirring is continued, and after about three and one-half hours, the Dry Ice condenser is removed and the ammonia is allowed to evaporate. A mixture of 30 ml. of diethyl ether and about 50 g. of ice is then added to the flask contents and the mixture is stirred for about 30 minutes. The reaction flask is cooled externally by means of an ice bath during this addition. The 5-hydroxy-5-(3-methylaminopropynyl)dibenzo[a,d]cyclohepta[1.4]diene precipitates and is separated by filtration, washed with water and then ether, and dried under vacuum at 45° C. The product, after recrystallization from a mixture of benzene and ethanol, melts at 156–160° C.

*Analysis.*—Calc.: C, 82.28; H, 6.90; N, 5.05. Found: C, 82.23; H, 7.01; N, 4.89.

*Method B.*—To a suspension of sodium amide prepared from 2.1 g. of sodium in 125 ml. of liquid ammonia there are added 5.8 g. of 3-methylamino-1-propyne, prepared from anhydrous methylamine and propargyl chloride. The resulting mixture is stirred for about forty minutes in a flask equipped with a Dry Ice condenser and is then treated with a solution of 7 g. of 5-ketodibenzo[a,d]cyclohepta[1.4]diene in 25 ml. of xylene. After about three and one-half hours the condenser is removed and the ammonia is allowed to evaporate overnight. The suspension which remains is treated with about 30 g. of ice. The crude product is recovered by filtration and is washed with water and ether. Recrystallization from a solvent mixture of equal parts by volume of benzene and ethanol affords 7.4 g. of product melting at 155–160.5° C.

EXAMPLE 8

*5-hydroxy-5-(3-methylaminopropyl)dibenzo[a,d]cyclohepta[1.4]diene hydrochloride*

*Method A.*—A mixture of 1 g. of 5-hydroxy-5-(3-methylaminopropynyl)dibenzo[a,d]cyclohepta[1.4]diene, 30 ml. of absolute ethanol, and 0.05 g. of 5 percent palladium on alumina is shaken under an initial hydrogen pressure of 40 p.s.i. at room temperature for 18 hours. After filtration to remove the catalyst and evaporation of the filtrate, a viscous syrup remains. This syrup is dissolved in 40 ml. of ether and is treated with anhydrous hydrogen chloride to precipitate the 5-hydroxy-5-(3-methylaminopropyl)dibenzo[a.d]cyclohepta₁1.4]diene hydrochloride, which melts at about 192° C.

*Analysis.*—Calc.: C, 71.79; H, 7.61. Found: C, 71.91; H, 7.40.

*Method B.*—To a stirred suspension of 3.8 g. of lithium aluminum hydride in 200 cc. of anhydrous ether are added gradually 14.7 g. of 5 - hydroxy - 5 - (3 - formamidopropyl)dibenzo[a,d]cyclohepta[1.4]diene. When the addition has been completed, the reaction mixture is heated under reflux for four hours. Decomposition of the reaction mixture is effected by successive addition of 4 ml. of water, 4 ml. of 15 percent aqueous sodium hydroxide, and 12 ml. of water. The reaction mixture is filtered and the filter cake is extracted repeatedly with ether. The filtrate and combined ether extracts are dried over anhydrous magnesium sulfate. After filtration to remove the drying agent, the filtrate is treated with anhydrous hydrogen chloride to precipitate the 5 - hydroxy - 5 - (3 - methylaminopropyl)dibenzo₁a,d]cyclohepta[1.4]diene in the form of the hydrochloride salt. This product is identical in all respects to that obtained by the procedure described in the preceding paragraph.

EXAMPLE 9

*5-(3-methylaminopropylidene)dibenzo[a,d]cyclohepta [1.4]diene*

*Method A.*—A mixture of 114.5 g. of 5 - (3 - chloropropylidene)dibenzo[a,d]cyclohepta[1.4]diene, 75 ml. of benzene, and about 400 ml. of methylamine is heated in an autoclave at 120° C. for six hours. The excess methylamine is distilled from the reaction mixture under vacuum and the residue is stirred with 300 ml. of water. Acidification of the mixture with hydrochloric acid causes the separation of the hydrochloride of 5-(3-methylaminopropylidene)dibenzo[a,d]cyclohepta[1.4]diene. The product is collected by filtration and is purified by recrystallization from a mixture of absolute ethanol and ethyl acetate. M.P. 210-212° C.

*Method B.*—5 - hydroxy - 5 - (3 - methylaminopropyl) dibenzo[a,d]cyclohepta[1.4]diene hydrochloride is heated above its melting point at about 195° C. for about 30 minutes. After being cooled, the residue is recrystallized from 95 percent ethanol to give 5 - (3 - methylaminopropylidene)dibenzo[a,d]cyclohepta[1.4]diene hydrochloride melting at 210-212° C. The product is identical to that obtained by the procedure described in the preceding paragraph.

We claim:

1. The process for preparing a 5 - hydroxy - 5(3 - substituted alkynyl)dibenzo[a,d]cyclohepta[1.4]diene of the formula:

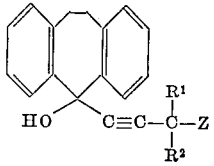

wherein $R^1$ and $R^2$, when taken separately, are selected from the class consisting of hydrogen and lower alkyl; $R^1$ and $R^2$, when taken together with the carbon atom to which they are attached, form a $C_4$-$C_7$ cycloaliphatic ring; Z is —NHR; and R is selected from the class consisting of hydrogen, lower alkyl, and benzyl; which comprises reacting 5 - ketodibenzo[a,d]cyclohepta[1.4]diene with an alkali-metal derivative of a compound of the formula

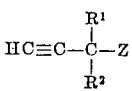

wherein $R^1$, $R^2$, and Z are as defined hereinbefore, in an inert organic mutual solvent for a period of time sufficient to complete the reaction thereof to yield an alkali-metal salt of a 5 - hydroxy - 5 - (3 - substituted alkynyl) dibenzo[a,d]cyclohepta[1.4]diene; and commingling the reaction product mixture with water, whereby said alkali-metal salt is hydrolyzed to produce said 5 - hydroxy - 5- (3-substituted alkynyl)dibenzo[a,d]cyclohepta[1.4]diene.

2. The process for preparing 5 - hydroxy - 5 - (3-methylaminopropynyl)dibenzo[a,d]cyclohepta[1.4]diene which comprises reacting 5 - ketodibenzo[a,d]cyclohepta [1.4]diene with an alkali-metal derivative of 3 - methylamino - 1 - propyne in liquid ammonia for a period of time sufficient to complete the reaction thereof to yield the alkali-metal salt of 5 - hydroxy - 5 - (3 - methylaminopropynyl)dibenzo[a,d]cyclohepta[1.4]diene; and commingling the reaction product mixture with water, whereby said alkali-metal salt is hydrolyzed to produce 5-hydroxy - 5 - (3 - methylaminopropynyl)dibenzo[a,d]cyclohepta[1.4]diene.

3. The process for preparing 5 - hydroxy - 5 - (3-methylaminopropynyl)dibenzo[a,d]cyclohepta[1.4]diene which comprises reacting 2 - chloro - 3 - methylamino-1 - propene, 5 - ketodibenzo[a,d]cyclohepta[1.4]diene, and an alkali-metal amide in liquid ammonia for a period of time sufficient to complete the reaction thereof to yield the alkali-metal salt of 5 - hydroxy - 5 - (3 - methylaminopropynyl)dibenzo[a,d]cyclohepta[1.4]diene; and commingling the reaction product mixture with water, whereby said alkali-metal salt is hydrolyzed to produce 5-hydroxy - 5 - (3 - methylaminopropynyl)dibenzo[a,d]cyclohepta[1.4]diene.

References Cited by the Examiner

UNITED STATES PATENTS

| 2,485,174 | 10/1949 | Tarbell et al. | |
| 3,052,721 | 9/1962 | Bernstein et al. | 260—562 |
| 3,073,847 | 1/1963 | Doebel et al. | 260—328 |
| 3,116,291 | 12/1963 | Petersen et al. | |

FOREIGN PATENTS

| 1,109,166 | 6/1961 | Germany. |
| 858,186 | 1/1961 | Great Britain. |

OTHER REFERENCES

Derwent Belgian Patent Reports, vol. 68B, page C20, abstract of Pat. No. 587,479 (1960) For. Pat. J.R.I.

Derwent Belgian Patent Reports, vol. 58A, page C21, abstract of Pat. No. 577,057, (1959), For. Pat. J.R.I.

Derwent Commonwealth Patent Reports, vol. 27, No. 1, pp. 230–240 (January 1962).

Dorier, "Compt. Rendus," vol. 196, pages 1677–8 (1933).

Meduna et al.: Jour. of Neuropsychiatry, vol. 2, No. 5, pp. 232–237, (June 1961).

Burger, "Medicinal Chemistry," volume I, page 32 (1951).

Winthrop et al.: Jour. of Org. Chem., vol. 27, No. 1, pp. 230–240 (Jan. 1962).

Derwent Commonwealth Patent Reports, vol. 213, Gp. 3A, p. 4, No. 57283/60, (1960).

CHARLES B. PARKER, *Primary Examiner.*

JOHN D. RANDOLPH, WALTER A. MODANCE, JOSEPH P. BRUST, *Examiners.*

R. PRICE, N. TROUSOF, R. V. VINES, *Assistant Examiners.*